United States Patent Office 3,505,459
Patented Apr. 7, 1970

3,505,459
FUMIGATION WITH BIS(TRIFLUOROMETHYL) DISULFIDE
Robert E. A. Dear and Everett E. Gilbert, Morristown, N.J., assignors to Allied Chemical Corporation, New York, N.Y., a corporation of New York
No Drawing. Filed Apr. 23, 1968, Ser. No. 723,586
Int. Cl. A01n *17/02*
U.S. Cl. 424—336                                    2 Claims

ABSTRACT OF THE DISCLOSURE

Use of bis(trifluoromethyl)disulfide as a fumigant.

---

This invention is directed to the use of bis(trifluoromethyl)disulfide as a fumigant and, more particularly, to a process for the control of pest organisms by subjecting the organisms to the vapor of bis(trifluoromethyl)disulfide.

As is known in the art, the control of pest organisms which infest hosts such as soil, grain, fruits, vegetables, textiles, dwellings, warehouses and the like is extremely difficult in those cases where the pest organisms penetrate deeply into the interior of the host space. Use of surface poisons or pesticides for this purpose is not completely effective because of the difficulty in reaching the interior of the space. Although various fumigants have been proposed for controlling such pest organisms, there is a need for new and effective fumigants.

We have now discovered that bis(trifluoromethyl)disulfide is an outstanding fumigant, exerting lethal effects against common penetrating pest organisms such as those infesting plants, plant parts, grain, flour, carpets, etc.

Whenever the term "pest organisms" is used in the present specification and claims, it is to be understood as referring to the pest organisms in adult, pupal, nymphal, larval or egg stages.

Bis(trifluoromethyl)disulfide, a volatile liquid having a boiling point of about 35° C., may be prepared by the reaction of thiophosgene or trichloromethanesulfenyl chloride with an alkali metal fluoride, as described in U.S. Patent 2,884,453 of Apr. 28, 1959.

In the process of this invention, the pest organisms are subjected to an atmosphere comprising a lethal concentration of bis(trifluoromethyl)disulfide. The process involves contacting the pest organisms with the vapor of bis(trifluoromethyl)disulfide in the enclosure in which the pest organisms live.

Bis(trifluoromethyl)disulfide is particularly applicable in combating infestation of pest organisms in grain, flour, and other stored products, whether contained in storage bins, grain elevators and the like, and in combating pest organisms which infest plants. Bis(trifluoromethyl)disulfide is also effective for the control of other pest organisms such as pea aphids, two-spotted spider mites, Mexican bean beetles, Southern armyworms, etc.

The pest organisms are subjected to a toxic concentration of bis(trifluoromethyl)disulfide according to well-established methods known to the art. According to a typical method, the toxicant is introduced into the enclosure in which the pest organisms exist in such manner that it is free to volatilize and permeate the atmosphere. If desired, the toxicant may be used in combination with known fumigants.

In general, a dosage of at least about 0.01 to 0.4 pound of the toxicant per 1000 cubic feet of enclosed space is sufficient to permeate the area and to ensure effective control of the pest organisms. The exposure time required depends upon the size of the enclosed area and the type of host, e.g. grain, or flour, in the area. In an area of 1000 cubic feet, the time generally required for most effective fumigation is from about 8 hours to about 24 hours. In larger areas, such as grain elevators, desirable fumigation times may be about 24 to 36 hours.

The fumigation may be carried out, for example, by placing the toxicant in an open container or shallow tray in close contact with the atmosphere surrounding the pest organisms under conditions which permit vaporization of the toxicant.

If desired, the toxicant can be supplied in the form of a spray employing solutions or emulsions of the toxicant in organic solvents and/or in water. Carbon tetrachloride, perchloroethylene, chloroform, deodorized oils such as kerosene, xylene and methylated naphthalenes may be used as solvents. With the addition of suitable propellants, Aerosol compositions may also be formulated.

Fogging may be employed if rapid dispersion of the toxicant into the atmosphere is desired. For example, deodorized kerosene containing the toxicant may be fogged into a warehouse from one or more points. Volatilization of the toxicant occurs in the air permitting a rapid build-up of vapor which is dispersed relatively evenly throughout the free air space in the warehouse.

In treating grain or flour, the toxicant may be simply poured or sprayed over the grain or flour where it is contained in the enclosure, such as storage warehouses, bins, elevators and the like, and allowed to vaporize and to remain in the enclosed space until it has substantially completely volatilized or permeated the space. Since the vapor is heavier than air, it tends to sink to the bottom of the enclosure and penetrate the grain or flour as it settles, killing the pest organisms.

The effectiveness of bis(trifluoromethyl)disulfide as a fumigant is illustrated by the tests and results described in the following examples:

EXAMPLE 1

Test insects together with a small amount of appropriate food such as grain or flour were placed in 1.5 inch diameter salve tins with perforated lids. The tins were then placed in separate gallon jars. Various doses of bis(trifluoromethyl)disulfide were placed into the jars, and the jars were immediately sealed. The test insects were treated with bis(trichloromethyl)disulfide, the corresponding chlorinated analog of bis(trifluoromethyl)disulfide, in the same manner. After the indicated time of exposure, the insect containers were removed and mortality counts were made after five or six days. The following results were obtained:

| Toxicant | Dosage (Ounces per 1,000 cubic feet) | Time of exposure (hours) | Days after exposure | CFBA | BCBL | YMWL |
|---|---|---|---|---|---|---|
| Bis(trifluoromethyl)disulfide | 16 | 20 | 5 | 100 | 100 | 100 |
| Do | 8 | 18 | 5 | 100 | 100 | 100 |
| Do | 4 | 18 | 5 | 100 | 100 | 100 |
| Do | 2 | 18 | 6 | 100 | 100 | 100 |
| Do | 1 | 18 | 6 | 100 | 100 | 100 |
| Bis(trichloromethyl)disulfide | 16 | 20 | 5 | 0 | 0 | 0 |
| Control | | | 6 | 0 | 0 | 0 |

CFBA = Confused flour beetle adults.
BCB = Black carpet beetle larvae.
YMWL = Yellow mealworm larvae.

EXAMPLE 2

Follow-up soil penetration tests were carried out using bis(trifluoromethyl)disulfide. Pill boxes containing test insects were buried under 4 inch moist sandy loam soil in gallon jars. Bis(trifluoromethyl)disulfide in the doses indicated was introduced, and the jars were sealed for twenty hours. The sealed boxes were removed at the end of the twenty hour period, and mortality count was made after four days. The following results were obtained:

| Dosage | Percent Mortality | | | |
|---|---|---|---|---|
| | CFBA | BCBL | YMWL | Termites |
| (Ounces per 1,000 cubic feet): | | | | |
| 16 | 100 | 100 | 100 | 100 |
| 8 | 100 | 100 | 100 | 100 |
| 4 | 100 | 100 | 100 | 100 |
| Control | 0 | 0 | 0 | 0 |

EXAMPLE 3

Broad bean plants infected with pea aphid adults (PAA) and cranberry bean plants infected with two-spotted spider mites (TSSM) were placed in gallon jars, along with housefly pupae (HFP), and eggs of Mexican bean beetle larvae (MBBL) and Southern armyworm larvae (SAL). After an exposure of 17 hours to the bis(trifluoromethyl) disulfide, the following results were obtained:

| Dosage | PAA | TSSM | HFP | MBBL (Eggs) | SAL (Eggs) |
|---|---|---|---|---|---|
| Ounces per 1,000 cubic feet: | | | | | |
| 16 | 100 | 100 | 100 | 100 | 100 |
| 8 | 100 | 100 | 100 | 100 | 100 |
| 4 | 100 | 100 | 100 | 100 | 100 |
| Control | 0 | 2.7 | 0 | 0 | 0 |

We claim:
1. A process for the control of pest organisms selected from the group consisting of insects and mites, infesting an enclosed space which comprises subjecting said organisms to an atmosphere comprising a lethal concentration of bis(trifluoromethyl)disulfide.
2. The process of claim 1 wherein the bis(trifluoromethyl)disulfide is employed in a concentration of at least about 0.01 to 0.4 pound per 1000 cubic feet of enclosed space.

References Cited

UNITED STATES PATENTS

| 3,088,818 | 5/1963 | Geering | 424—336 |
| 3,360,430 | 12/1967 | Giolito | 424—336 |

ALBERT T. MEYERS, Primary Examiner

J. V. COSTIGAN, Assistant Examiner